United States Patent [19]

Mittermaier et al.

[11] Patent Number: 4,864,696

[45] Date of Patent: Sep. 12, 1989

[54] HOSE CLAMP FOR A FUEL DISPENSING SYSTEM

[75] Inventors: Armin E. Mittermaier; John S. Loy, both of Fort Wayne, Ind.

[73] Assignee: Tokheim Corporation, Fort Wayne, Ind.

[21] Appl. No.: 159,686

[22] Filed: Feb. 24, 1988

[51] Int. Cl.⁴ .............................................. F16G 11/02
[52] U.S. Cl. ................................. 24/285; 24/132 R; 141/389; 222/529; 222/74; 248/548; 403/2; 403/133
[58] Field of Search ............... 24/285, 284, 16 R, 335, 24/339, 340, 115 F, 115 L, 119, 132 R, 521, 704; 141/389; 248/548, 900; 222/527, 529, 74; 403/2, 361, 132, 133, 143

[56] References Cited

U.S. PATENT DOCUMENTS

| | | | |
|---|---|---|---|
| 2,665,128 | 12/1951 | Guffey | 267/ |
| 3,160,333 | 7/1962 | Budrow | 222/ |
| 3,383,739 | 5/1968 | Pitzel | 24/132 R |
| 3,395,723 | 8/1968 | Tatsuno | 137/ |
| 3,479,441 | 11/1969 | Moore | 24/132 R X |
| 3,985,325 | 10/1976 | Ginsburg et al. | 248/548 X |
| 4,059,360 | 11/1977 | Teissier | 403/2 |
| 4,260,275 | 4/1981 | Chevallier | 403/133 |
| 4,517,913 | 3/1985 | Albertini et al. | 114/ |
| 4,617,975 | 10/1986 | Rabushka et al. | 141/ |
| 4,723,053 | 2/1988 | Amaya | 24/135 R X |

Primary Examiner—Kenneth J. Dorner
Assistant Examiner—Laurie K. Cranmer
Attorney, Agent, or Firm—Albert L. Jeffers; Anthony Niewyk

[57] ABSTRACT

A hose clamp for clamping a swivel hose in a fuel dispensing installation. The hose clamp includes a breakable portion by which the hose clamp is connected to a retrieving cable. When sufficient force is placed on the cable, the hose clamp will break away from the cable thereby releasing the hose from the dispensing installation.

13 Claims, 2 Drawing Sheets

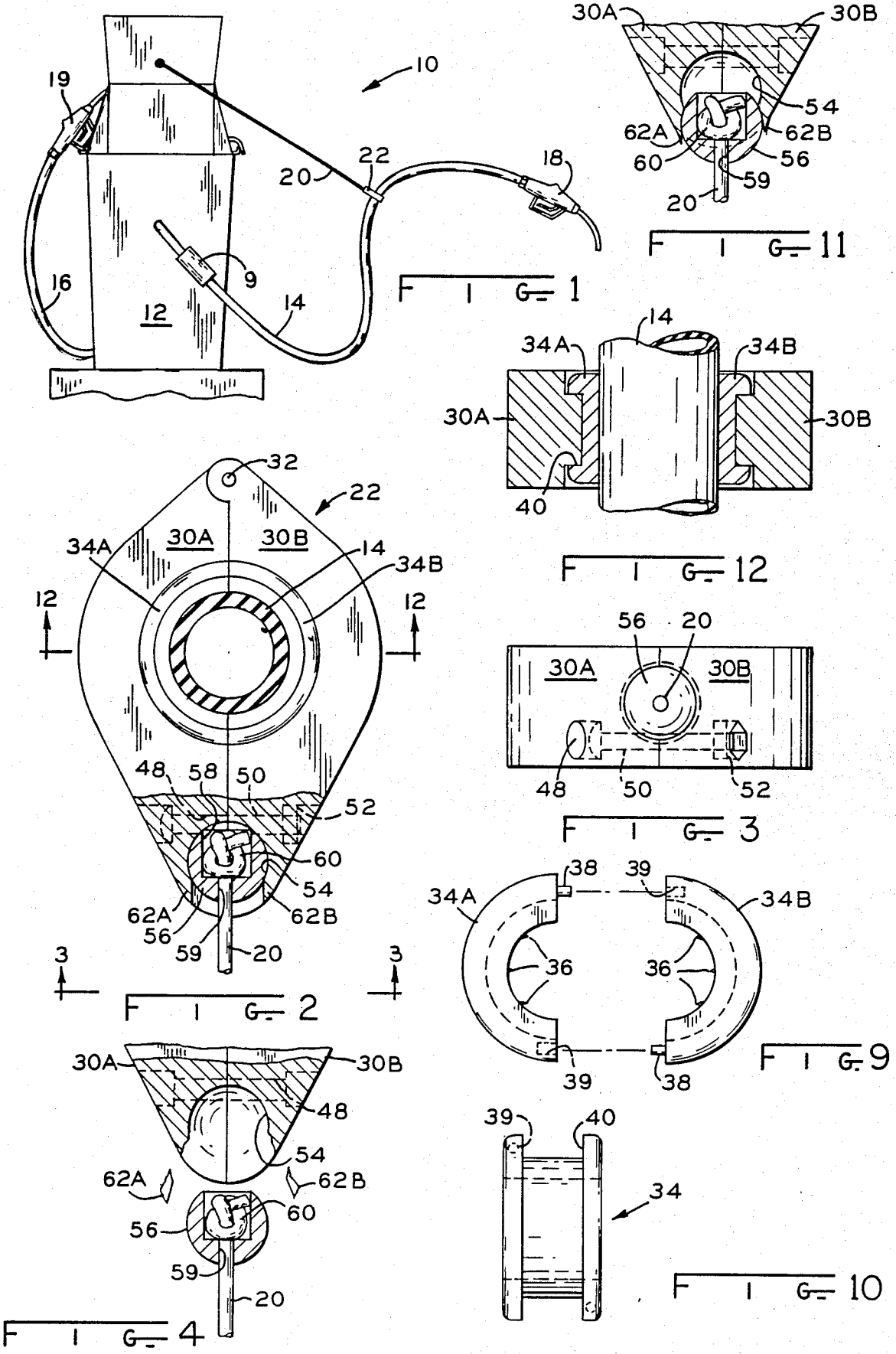

HOSE CLAMP FOR A FUEL DISPENSING SYSTEM

BACKGROUND OF THE INVENTION

This invention relates to fuel dispensing installations, and more particularly to hose clamps for use with fuel dispensing installations.

Fuel dispensing installations for fueling vehicles, such as automobiles, generally include a fuel delivery pump and a fuel delivery hose coupled thereto and having a nozzle at the other thereof for delivering fuel from the fuel delivery pump to the vehicle tank. Many such fuel dispensing systems include a cable connected to the hose by means of a hose clamp and a cable retrieving mechanism for retrieving the cable and the hose to a storage position when the hose is not in use. The cables are generally made of braided steel wire or nylon and are therefore very strong.

In recent years, many such fuel dispensing installations have become self-service installations wherein the customer himself dispenses the fuel. Since customers are not experienced in dispensing fuel, it is possible that a customer may on occasion forget to remove the dispensing nozzle from the filler neck of the vehicle fuel tank and drive away from the fuel dispensing installation with the nozzle still in place in the filler neck of the automobile fuel tank. In some instances, the nozzle will pull out of the filler neck of the fuel tank and fall harmlessly to the ground. However, in other instances, the nozzle will not pull out of the filler neck of the vehicle fuel tank whereby the resulting high tension load on the fuel delivery hose pulls the fuel delivery pump free of its moorings to the service station pump island. This situation will, of course, result in spillage of fuel on the ground and a potentially dangerous situation.

Certain prior art fuel dispensing installations have been provided wherein the fuel delivery hose is provided with a breakaway coupling or breakaway valve, whereby, when sufficient tension is placed on the hose, the hose will break free from the coupling or the valve. However, in those fuel dispensing installations wherein the hose is connected by a cable to a cable retrieving mechanism in the fuel dispensing pump housing, the cable remains attached to the hose and will continue to exert sufficient tension on the fuel dispensing pump to pull it free of its moorings. Thus it is desired to provide a hose clamp for a fuel dispensing installation wherein the clamp itself will also be pulled free from the cable when excessive tension is placed on the cable.

SUMMARY OF THE INVENTION

The present invention, in one form thereof, provides a breakaway hose clamp for a fuel dispensing installation whereby the hose retrieving cable can break free of the hose upon the existence of a predetermined amount of tension in the cable.

The hose clamp according to the present invention, in one form thereof, includes a collar secured to a portion of the hose, and a housing in which the collar is rotatably received. A swivel has one end thereof secured to a cable and its other end secured to a swivel pin which forms part of the hose clamp housing. The swivel is secured to the hose clamp housing by means of a frangible portion which will break and thereby release the cable when the cable is placed under a predetermined amount of tension.

Thus, the present invention has the advantage of permitting the disconnection of the fuel dispensing hose from the retrieving cable when a certain amount of tension is placed on the cable. Therefore by using the hose clamp according to the present invention together with a breakaway valve coupling for the hose, the entire hose will be released when a certain amount of tension is placed on the hose. This, therefore, prevents pulling the pump from its moorings as well as spillage of fuel when a customer forgets to replace the fuel dispensing nozzle after dispensing fuel into his automobile fuel tank.

The present invention, in one form thereof, comprises a hose clamp assembly for clamping a fuel dispensing hose in a fuel dispensing installation whereby the hose may be connected to a cable retrieving mechanism. The clamp assembly comprises a clamping portion and an attaching portion for attaching the clamping portion to a retrieving cable. A frangible connecting portion connects the attaching portion to the clamping portion whereby the clamp will be released from the cable upon the occurrence of a predetermined tension force in the cable.

The present invention, in one form thereof, comprises a hose clamp assembly for connecting a fuel dispensing hose of a fuel dispensing installation to a cable retrieving mechanism. The hose clamp assembly comprises a collar for retaining a portion of the dispensing hose therein and a housing for rotatably retaining the collar. A swivel is adapted to be secured to a retrieving cable and the swivel is secured to the housing by a frangible connecting portion whereby the swivel will be released from the housing when the tension in the cable exceeds a predetermined force.

The present invention, in one form thereof, still further comprises a hose clamp assembly for connecting a fuel dispensing hose to the cable retrieving mechanism of a fuel dispensing installation. The hose clamp assembly includes a housing having two half sections pivotably connected together and forming a collar retention space therebetween. A swivel pin is connected to the housing and a collar having two mating semi-cylindrical sections is rotatably retained in the collar retention space. The collar includes internal projections for engaging with the fuel dispensing hose. A swivel including a portion adapted to be secured to a cable is secured to the swivel pin by means of an aperture for receiving the swivel pin therein. The swivel includes a frangible portion whereby the cable securing portion of the swivel will break free from the housing when the swivel cable securing portion is placed under a predetermined tensile force.

It is an object of the present invention to provide a breakaway clamp for a fuel dispensing hose in a fuel dispensing installation.

It is another object of the present invention to provide a breakaway clamp including a frangible portion which releases the clamp when a predetermined force is placed on the retrieving cable.

It is a further object of the present invention to provide a breakaway hose clamp for a fuel dispensing installation which is simple in construction and low in cost.

BRIEF DESCRIPTION OF THE DRAWINGS

The above mentioned and other features and objects of this invention and the manner of attaining them will become more apparent and the invention itself will be better understood by reference to the following description of an embodiment of the invention taken in conjunction with the accompanying drawings, wherein:

FIG. 1 is a perspective view of a fuel dispensing installation;

FIG. 2 is an elevational view, partially in cross section, of one embodiment of the hose clamp according to the present invention;

FIG. 3 is a bottom plan view of the hose clamp of FIG. 2;

FIG. 4 is a partial view of the hose clamp of FIG. 2 with the frangible portion thereof broken away and the swivel and cable released from the hose clamp;

FIG. 9 is a plan view of the hose clamp collar for the hose clamp of FIG. 1

FIG. 10 is a side view of the hose clamp collar of FIG. 9;

FIG. 11 is a partial view of the hose clamp of FIG. 2 with the swivel and cable released from the flexible shoulders;

FIG. 12 is a cross sectional view of the hose clamp of FIG. 2.

Corresponding reference characters indicate corresponding parts throughout the several views of the drawings.

Figure 5:
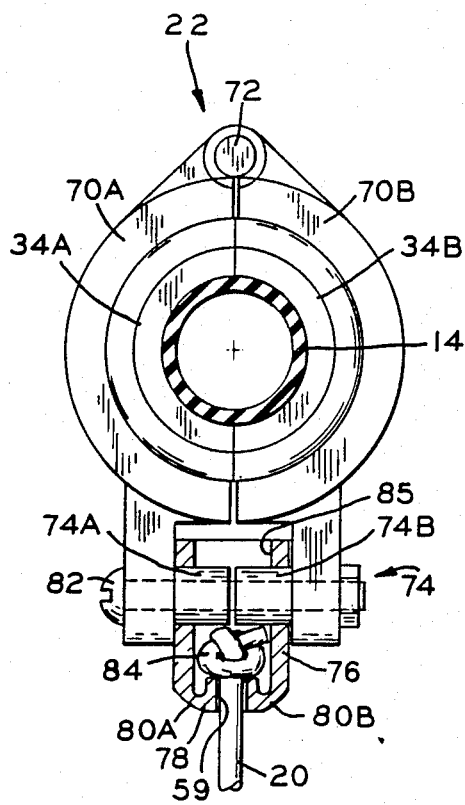
FIG. 5 is a elevational view of another embodiment of the hose clamp of the present invention.

The exemplifications set out herein illustrate a preferred embodiment of the invention, in one form thereof, and such exemplifications are not to be construed as limiting the scope of the disclosure or the scope of the invention in any manner.

DETAILED DESCRIPTION OF THE PREFERRED EMBODIMENT

Referring to FIG. 1, there is shown a fuel dispensing installation 10 including a fuel dispensing pump housing 12 and a pair of fuel dispensing hoses 14 and 16 which include a pair of nozzles 18 and 19. Fuel dispensing hose 16 is shown in the storage position and fuel dispensing hose 14 is shown in the dispensing position wherein the nozzle 18 can be inserted into the filler neck of a vehicle fuel tank. A cable 20 is connected to a hose clamp 22 which is secured to hose 14. The cable 20 is connected at its other end to a cable retrieving mechanism (not shown) located in dispensing pump housing 12. Thus, when the hose is to be stored, the cable 20 will be retrieved thereby pulling the cable clamp 22 and the attached hose toward the dispenser into the storage position shown for hose 16. Furthermore, hoses 14 and 16 are connected to dispenser 12 by means of respective breakaway valves 9. Cable 20 is connected to cable clamp 22 by a breakaway mechanism whereby, when a pulling force is placed on nozzle 18, the complete hose 14 may be pulled free of the dispenser.

One embodiment of the cable clamp 22 is shown in FIGS. 2-4 and 12. The cable clamp 52 includes a housing 30 formed of two pivoting sections 30A and 30B which are connected together by means of a pivot pin 32 such as a rivet or threaded bolt. Collar 34 is retained by housing 30 and clamps onto a hose 14. The collar is shown in greater detail in FIGS. 9, 10 and 12 and includes two halves 34A and 34B which are semi cylindrical. Internally of the collar halves, a plurality of teeth 36 are formed for gripping the hose whereby the collar 34, in its assembled position, firmly grips the hose and prevents movement of the hose 14 relative to the collar 34. Locating pins 38, which cooperate with apertures 39, align the collar halves 34A and 34B. The collar halves may be held together by one or more snap rings (not shown). Externally of the collar 34, a groove 40 is formed which cooperates with a corresponding ridge in housing 30 to rotatably retain collar 34 in housing 30. Hose 14 can therefore freely rotate inside housing 30 of clamp 22.

Thus, to assemble the collar 34 and the housing 30, the housing is pivoted open about pivot pin 32. The split collar 34 is assembled around a hose 14 and the entire collar 34 is captured in the housing 30.

The housing 30 includes an aperture 48 through which a bolt 50 extends to maintain housing halves 30A and 30B in the closed assembled position. A nut 52 is threaded onto bolt 50.

A cavity 54 is provided in an end portion of housing 30 in which a swivel 56 is disposed. The swivel 56 comprises a spherical ball having a cavity 58 therein. Cable 20 is threaded through an aperture 59 in spherical swivel 56 and a knot 60 is then formed in the end of the cable 20. Thus, in the assembled position, swivel 56 is swivelable in cavity 54 to accommodate movement of hose 14. When tension is placed on cable 20 to retrieve the hose, the interference of swivel 56 with shoulders 62A and 62B pulls the hose clamp 22 towards the dispenser 12. However, as shown in FIG. 4, when sufficient tension is placed on cable 20, shoulders 62A and 62B will break off from housing 30, thereby releasing swivel 56 and hose 14. Shoulders 62A and 62B could also be designed to be flexible under the increased tension to release swivel 56 and hose 14. An embodiment with this construction is shown in FIG. 11 with the shoulder 62A and 62B flexed apart to release swivel 56.

Thus, if a customer forgets to remove nozzle 18 from the filler neck of the fuel tank of his vehicle and then proceeds to drive away, the tension placed on cable 20 permits the frangible shoulders 62A and 62B to be broken off to release cable 20 from hose 14 to prevent the fuel dispensing pump to be placed under excessive force which could damage the dispensing pump.

Figure 6:
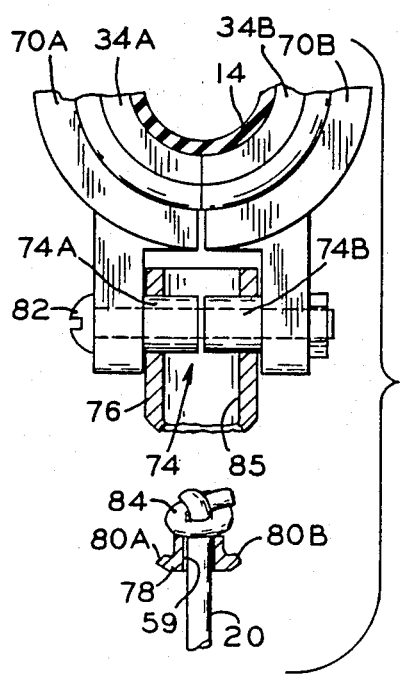
FIG. 6 is a partial elevational view of the hose clamp of FIG. 5 with the released therefrom.

A second embodiment of the hose clamp according to the present invention is shown in FIGS. 5 and 6. The hose clamp includes housing halves 70A and 70B which are pinned together by a pivot pin 72. A swivel pin 74 is formed from swivel pin portions 74A and 74B as the housing is assembled. Swivel 76 includes an aperture in which swivel pin 74 is received whereby swivel 76 may be pivoted to accommodate movement of a hose 14. In this embodiment, the top 78 of the swivel is connected to the main body 76 of the swivel by means of frangible portions 80A and 80B whereby the swivel top can be completely pulled free of the main swivel body portion 76 as shown in FIG. 6 when excessive force is placed on cable 20.

Figure 7:
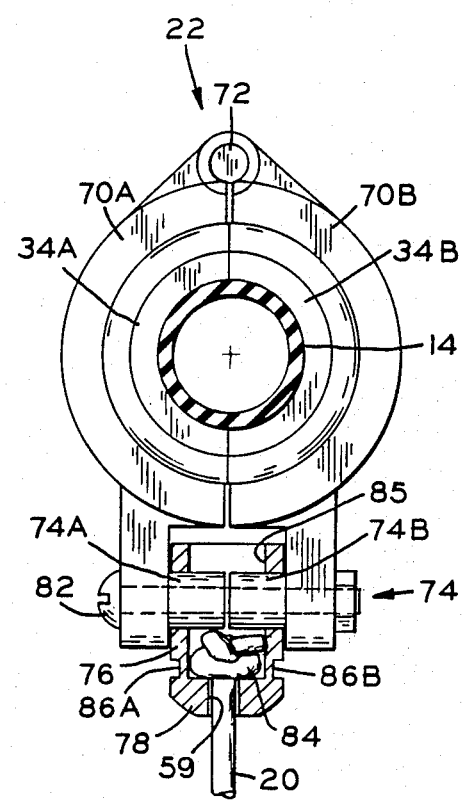
FIG. 7 is a still further embodiment of the hose clamp of the present invention.
Figure 8:
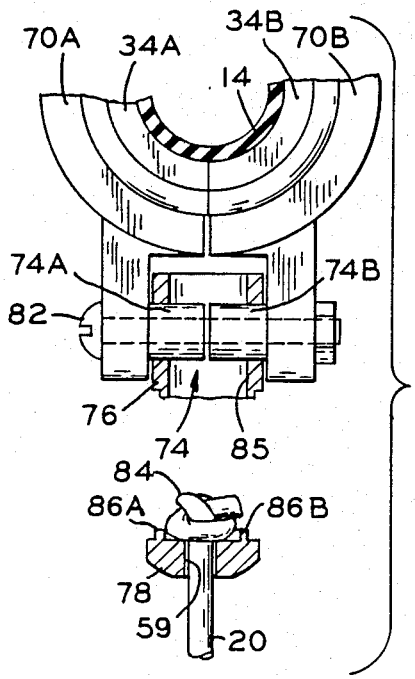
FIG. 8 is a partial view of the hose clamp of FIG. 7 with the cable released therefrom.

A still further embodiment is shown in FIGS. 7 and 8 wherein the swivel top 78 can again be pulled free of the main swivel body portion 76 by frangible portions 86A and 86B.

Thus by forming frangible portions of the swivel 76 or the housing 30, 70 with a small cross section whereby a predetermined force will break off the frangible portions, a releasable hose clamp has been provided.

It should be noted that the hose clamp is preferably constructed of a plastic material such as, for instance, molded nylon or PVC or any other suitable material.

While this invention has been described as having a preferred design, it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. A hose clamp assembly for clamping a fuel dispensing hose in a fuel dispensing installation whereby the hose may be connected to a retrieving cable mechanism, said clamp assembly comprising:

means for clamping a portion of said dispensing hose;
   means for attaching said clamping means to a retrieving cable; and
   a frangible connecting portion for connecting said attaching means to said clamping means whereby said clamping means will be released from said cable upon the occurrence of a predetermined tension in said table.

2. The hose clamp according to claim 1 wherein said clamping means comprises a collar, said attaching means comprises a swivel, and said frangible connecting portion comprises a portion of said swivel for connecting said swivel to said collar.

3. The hose clamp according to claim 1 wherein said clamping means includes a recess into which said attaching means is received, said attaching means being retained in said recess by said frangible connecting portion.

4. A hose clamp assembly for connecting a fuel dispensing hose of a fuel dispensing installation to a cable retrieving mechanism, said hose clamp assembly comprising:

a collar for retaining a portion of a dispensing hose therein;
   a housing for rotatably retaining said collar; and
   a swivel pivotally attached to said housing, said swivel adapted to be secured to a cable by a frangible connecting portion, said frangible connecting portion adapted to break off from said swivel when a predetermined force is applied to said cable whereby said swivel will be released from said housing when the tension in said cable exceeds said predetermined force.

5. The hose clamp assembly according to claim 4 wherein said frangible connecting portion comprises an integral part of said swivel.

6. The hose clamp assembly of claim 4 wherein said collar includes internally projecting means for engaging with said retained hose portion, thereby preventing relative movement between said retained hose portion and said collar.

7. The hose clamp assembly of claim 4 wherein said housing and collar include respective cooperating tongue and groove portions for rotatably retaining said collar in said housing.

8. A hose clamp assembly for connecting a fuel dispensing hose of a fuel dispensing installation to a cable retrieving mechanism, said hose clamp assembly comprising:

a collar including two semi-cylindrical mating sections for retaining a portion of a dispensing hose therein;
   a housing for rotatably retaining said collar; and
   a swivel adapted to be secured to a cable, said swivel secured to said housing by a frangible connecting portion whereby said swivel will be released from said housing when the tension in said cable exceeds a predetermined force.

9. A hose clamp assembly for connecting a fuel dispensing hose of a fuel dispensing installation to a cable retrieving mechanism, said hose clamp assembly comprising:

a collar for retaining a portion of a dispensing hose therein;
   a housing including a swivel pin, said housing for rotatably retaining said collar; and
   a swivel pivotally attached to said housing, said swivel comprising a hollow body with a swivel aperture in said body for receiving said swivel pin, said swivel adapted to be secured to a cable by a frangible connecting portion, said frangible connecting portion comprising a frangible collar located between said swivel aperture and the top of said hollow body whereby said swivel will be released from said housing when the tension in said cable exceeds a predetermined force.

10. A hose clamp assembly for connecting a fuel dispensing hose to a cable retrieving mechanism of a fuel dispensing installation, said hose clamp assembly comprising:

a housing including two half sections pivotably connected together and forming collar retention space therebetween;
    a swivel pin connected to said housing;
    a collar including two mating semi-cylindrical sections including means for engaging with a fuel dispensing hose, said collar including means for rotatable retention of a hose in said collar retention space;
    a swivel including a portion adapted to be secured to a cable, said swivel including an aperture for receiving said swivel pin therein, said swivel including a frangible portion whereby said swivel cable securing portion will break free from said housing when said swivel cable securing portion is pulled with a predetermined force.

11. The hose clamp assembly of claim 10 wherein said collar and housing include cooperating tongue and groove portions for rotatably retaining said collar in said housing.

12. A hose clamp assembly for clamping a fuel dispensing hose in a fuel dispensing installation whereby the hose may be connected to a retrieving cable mechanism, said clamp assembly comprising:

means for clamping a portion of said dispensing hose;
    means for attaching said clamping means to a retrieving cable; and
    a flexible connecting portion for connecting said attaching means to said clamping means whereby said clamp will be released from said cable upon the occurrence of a predetermined tension in said cable.

13. A hose clamp assembly for connecting a fuel dispensing hose to a cable retrieving mechanism of a fuel dispensing installation, said hose clamp assembly comprising:

a housing including two half sections pivotably connected together and forming collar retention space therebetween;

a swivel pin connected to said housing;

a collar including two mating semi-cylindrical sections including means for engaging with a fuel dispensing hose, said collar including means for rotatable retention of a hose in said collar retention space;

a swivel including a portion adapted to be secured to a cable, said swivel including an aperture for receiving said swivel pin therein, said swivel including a flexible portion whereby said swivel cable securing portion will break free from said housing when said swivel cable securing portion is pulled with a predetermined force.

* * * * *